United States Patent Office 3,794,577
Patented Feb. 26, 1974

3,794,577
FLEXIBLE COVER FOR AN ELECTROLYTIC CELL
Brian H. Oliver, Cuyahoga Falls, and Harry S. Custer, Barberton, Ohio, assignors to The Goodyear Tire & Rubber Company, Akron, Ohio
Filed May 9, 1972, Ser. No. 251,827
Int. Cl. B01k 3/00; C22d 1/04
U.S. Cl. 204—219                                          16 Claims

ABSTRACT OF THE DISCLOSURE

A flexible fluid impermeable elastomeric cover particularly for an electrolytic chlorine cell of the mercury type. The cover is comprised of a first vulcanized rubbery polymer contacted by the hot wet chlorine gas atmosphere originating within the cell and a second vulcanized rubbery polymer resistant to the permeation of fluids, heat and high ozone concentrations which is contacted by the oxygen and ozone atmosphere originating outside the cell. The first polymer is preferably polyisoprene and the second polymer is butyl, chlorobutyl, bromobutyl rubber or chlorosulfonated polyethylene. The cover may be at least a single layer of a vulcanized blend of the first and second polymer or a composite laminate comprised of separate layers of blend and/or the first and second polymers.

BACKGROUND OF THE INVENTION

This invention relate to a flexible elastomeric cover for an electrolytic chlorine cell. More particularly, this invention relates to covers for mercury-type electrolytic cells having improved fluid impermeable properties.

Chlorine may be prepared by a continuous electrolytic process within an electrolytic cell, for example, of the mercury type as described in the Encyclopedia of Chemical Technology, 2nd edition, vol. 1, pp. 688–695 (1963). One such cell referred to as the De Nora cell is disclosed in U.S. Pat. No. 2,958,635 issued on Nov. 1, 1960 to V. De Nora. In this cell, graphite anodes and a liquid mercury cathode are suspended in a water solution of the metallic salt of chlorine such as sodium chloride after which a high current is passed through the brine or electrolyte solution. The ionized halogen migrates to the anode where two atoms combine to make a molecule which is discharged from the salt solution and recovered through a vacuum line. The free metal dissolves in the mercury cathode to form an amalgam which floats on the mercury and can therefore be withdrawn from the cell.

The free chlorine will normally contain a quantity of water from the brine which results in the formation of very corrosive substances in the hot gaseous chlorine atmosphere within the cell. Because very high electrical currents are necessary in the electrolytic process for producing chlorine, the atmosphere about the cell contains a high concentration of oxygen and ozone which especially when taken in combination, are extremely deleterious to most elastomeric compositions. Thus, electrolytic cell covers are subject to attack from both within and outside of the mercury cell.

Previously, these covers had been produced from laminates of elastomeric material with separate discernible layers integrally joined together during vulcanization. For example, one common laminate has been an inwardly facing layer of polyisoprene and an outwardly facing layer of neoprene rubber. In addition, U.S. Pat. No. 2,998,374 issued on Aug. 29, 1961 to P. G. Granfors discloses an elastomeric laminate having 3 layers or plies in which a layer of polyisoprene is sandwiched between inner and outer layers of neoprene rubber. It is also disclosed in this patent that chlorosulfonated polyethylene may be substituted for the neoprene and butyl rubber may be substituted for the polyisoprene. U.S. Pat. No. 3,450,621 issued on June 17, 1969 to R. F. Anderson discloses a laminated cover for a De Nora type cell characterized by an inner layer of natural rubber facing inwardly of the cell and an outer layer of ethylene propylene terpolymer material facing outwardly of the cell which may be bonded together by a tie gum layer of chlorinated butyl rubber disposed between the first named layers. These prior art constructions have not proven to be entirely satisfactory and have not successfully withstood the combined effects of hot wet chlorine gases within the cell and high oxygen and ozone concentrations immediately outside the cell.

The apparent rationale of previous chlorine cell cover constructions was that a layer of a chlorine impermeable polymer such as polyisoprene, e.g. natural rubber, was disposed at or near the inner surface of the cover to contact the corrosive chlorine atmosphere within the tank and the outwardly disposed layer of the cover was comprised of a highly ozone-resistant material such as neoprene rubber or ethylene propylene terpolymer rubber. Although the rationale seems logical enough in theory, it is apparently incorrect since under actual conditions, the cell covers as previously described have not withstood the combined effects of the substances within and outside the cells. For example, it has been found that the ozone resistant outer layers have shown as much effects of the chlorine degradation as has the inner layers of the cover and in fact have also shown failures which appear to be ozone cracking. On the other hand, laboratory data indicates that the cell covers should have the capabilities of withstanding high ozone concentrations for almost an indefinite period when material such as ethylene propylene terpolymer are used to form the outer layer of the cover. It has also been determined that the outer neoprene layers have not been sufficiently resistant to heat and high ozone concentrations.

In accordance with the present invention, it is contended that improved cell covers are provided from blended compositions of single layers or combined laminated layers of heat and ozone resistant fluid impermeable materials used in arrangements heretofore not disclosed which resist not only the permeation or penetration of hot wet chlorine gases and other corrosive fluid substances from within the cell but also resist the permeation or penetration of oxygen and ozone gases from outside the cell.

OBJECTS OF THE INVENTION

It is therefore a primary object of the present invention to provide a flexible cell cover for an electrolytic cell capable of withstanding the deleterious substances present both within the cell and outside the cell.

It is another primary object of the present invention to provide an elastomeric cover for a chlorine cell having improved fluid impermeable properties to resist the penetration by gaseous atmospheres both within and outside of the cell.

It is still another object of the present invention to provide electrolytic chlorine cell covers of single or multiple layers which will withstand the combined effects of chlorine, heat, oxygen and ozone.

In accordance with the present invention, it has been found that the above objects are accomplished in an electrolytic cell for the production of chlorine by providing a flexible elastomeric cover for the cell with the cover being comprised of a first vulcanized rubbery polymer resistant to the permeation of chlorine which is contacted by the hot wet chlorine gas atmosphere originating within the cell and a second vulcanized rubbery polymer resistant to the permeation of fluids, heat and high ozone concentrations with the second polymer being in contact with the oxygen and ozone atmosphere originating outside the cell. The cell cover thereby is resistant to the combined deleterious effects of chlorine, oxygen, ozone and heat.

Also in accordance with the present invention, the first polymer is a polyisoprene selected from the group consisting of natural rubber and synthetic rubber of a cis-1,4 polymer of isoprene and the second polymer is at least one polymer selected from the group consisting of butyl rubber, chlorinated butyl rubber, brominated butyl rubber and a chlorosulfonated polyethylene.

The cover may include at least one layer comprised of a vulcanized blend of the first and second polymers or be a laminate of at least 2 discernible layers with the innermost downward layer comprised of a first polymer and the outermost upward layer comprised of the second polymer. Alternately, the innermost downward layer may be comprised of the first polymer and the outermost upward layer comprised of a vulcanized blend of the first and second polymers or the laminate may be at least 2 discernible layers with the innermost downward layer comprised of a vulcanized blend of the first and second polymers and the outermost upward layer comprised of the second polymer.

It is preferred that the second polymer is at least one halogenated polymer of butyl rubber selected from the group consisting of chlorinated butyl and brominated butyl rubber and that the weight ratio of polyisoprene to the halogenated polymer be from about 35/65 to about 65/35. In an even more preferred embodiment of the invention, the second polymer is chlorinated butyl rubber and the weight ratio of polyisoprene to the chlorinated butyl rubber is from about 45/55 to about 55/45.

It is to be understood that for the purposes of this invention, the term "vulcanized" is used in its broadest sense to include all means of cross-linking rubbery polymers both with and without the use of sulfur. It is to be further understood that "vulcanized blend" means the covulcanization of each component or polymer of the blend.

DESCRIPTION OF THE PREFERRED EMBODIMENTS

Figure 1:
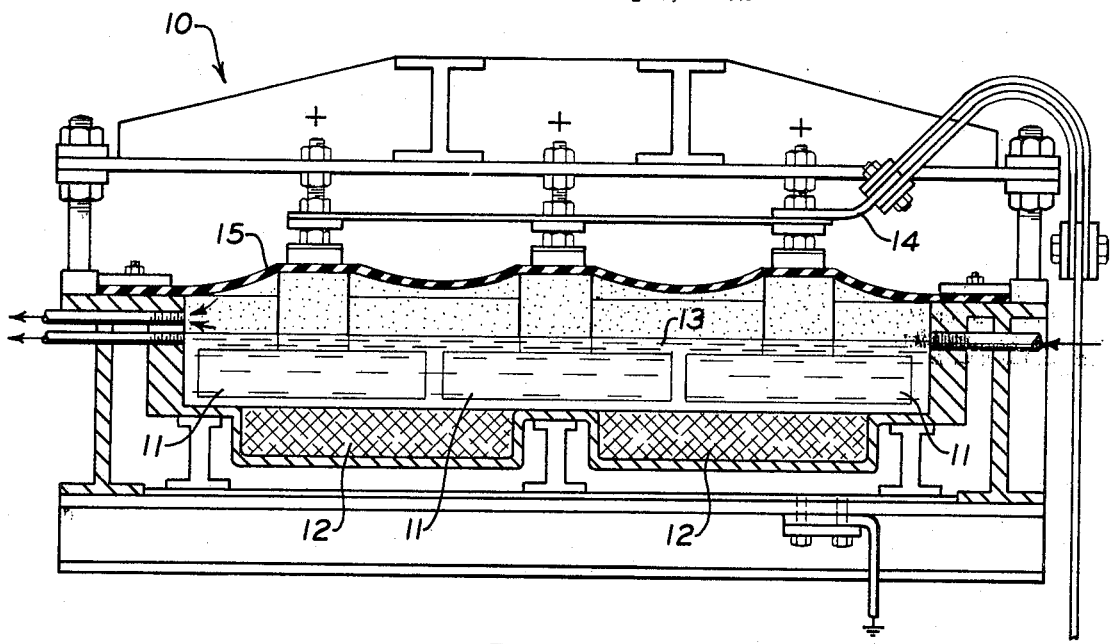
FIG. 1 is a schematic cross-section of a typical electrolytic chlorine cell of the mercury type including the cell cover of this invention.

In FIG. 1 a customary electrolytic chlorine cell 10 is shown having graphite anodes 11 and mercury cathodes 12 which are suspended in a brine 13 comprised of a water solution of sodium chloride. In order to provide gaseous chlorine, a high electrical current is passed through line 14 into the anodes in order that a current will pass through the brine. The ionized chlorine will migrate to the anodes 11 and pass through the surface of the brine solution as molecular chlorine. The gaseous chlorine, which contains some water vapor, is thereafter purified and collected.

Figure 2:
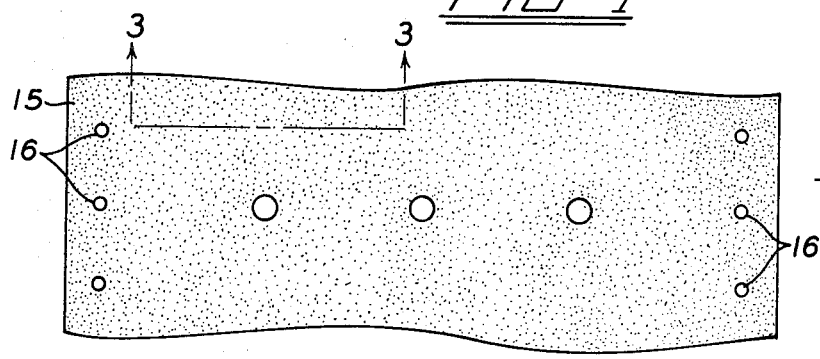
FIG. 2 is a plane view of a chlorine cell cover of this invention.

The cell cover 15 is shown in its uninstalled condition in FIG. 2. The cover 15 in this instance is formed of a single layer of rubbery polymeric material and includes a plurality of holes 16 which preferably are punched through the cover after vulcanization in order that the cell cover may be bolted to the top of the cell 10.

Figure 3:
FIG. 3 is an enlarged section of a chlorine cell cover taken along the lines 3—3 of FIG. 2.

As illustrated in FIG. 3, in this instance the cover is a single layer 17 of a vulcanized blend of a first vulcanized rubbery polymer resistant to the permeation and attack of the chlorine such as polyisoprene and a second vulcanized rubbery polymer resistant to the permeation of fluids, heat and high ozone concentrations such as chlorinated butyl rubber. The first polymer may be natural rubber or synthetic rubbers of a cis 1,4 polymer of isoprene known as synthesized "natural rubber" and the second polymer may also be a fluid-impermeable polymer such as butyl or brominated butyl rubber or a chlorosulfonated polyethylene. The vulcanized blend is in contact with the hot wet chlorine gas atmosphere within the cell and with the oxygen and ozone atmospheres outside the cell. The polyisoprene polymer resists the permeation of chlorine and other deleterious gaseous fluid substances within the cell and the chlorinated butyl rubber is essentially impermeable to the penetration or diffusion of the oxygen and ozone atmosphere outside the cell. In addition, the chlorobutyl rubber has a high heat resistance. The cover 15 thereby resists the combined effects of all the deleterious substances known to exist within or outside the mercury electrolytic cell 10.

From investigations of previous cover structures, it is apparent that the area of the cover most susceptible to the attack of the deleterious substances within and outside the cell are those locations in contact with the anodes 11 where the anodes extend through the cover 15 and around the periphery of the cover which is bolted or otherwise attached to the flange of the cell 10. These locations of the cover are under the greatest stress during the operation of the cell, particularly when a vacuum is drawn to recover the free chlorine. Also, as shown in FIG. 1, the portions of the cover 15 which are disposed between the anodes 4 and between the anodes and the cell flange tend to hang downwardly or sag after long periods of use. This also causes stresses at these points of connection. Consequently, it is highly desirable that the elastomeric or polymeric material of the cover 15 be of a relatively high modulus with good tension set characteristics. For example, the material of the cover should have a modulus of at least 500 p.s.i. when elongated 200 percent when tested in accordance with the method prescribed by the American Society for Testing and Materials (ASTM D–412). Typically, tension set should be about 40 percent after heat aging the elastomeric material of the cell for 168 hours at 212° F. The durometer hardness of the cover is typically about 60 measured on the Shore A scale.

Although in FIG. 3 the cover is illustrated as a single layer of the vulcanized blend of this invention, the cover 15 may also include layers of other elastomeric or polymer materials in combination with this layer 15. For example, an outwardly facing layer in combination with the layer 15 may be comprised of an ozone resistant material such as polychloroprene or ethylene propylene terpolymer.

Figure 4:
FIGS. 4–6 are alternate embodiments of the invention shown in FIG. 3.

FIG. 4 illustrates that the composite laminated cell cover 18 can be comprised of an inner layer 19 of polyisoprene and an outer layer 20 of chlorinated butyl rubber, each functioning as previously described to resist heat and the permeation of deleterious, gaseous or fluid substances into the cover.

Figure 5:
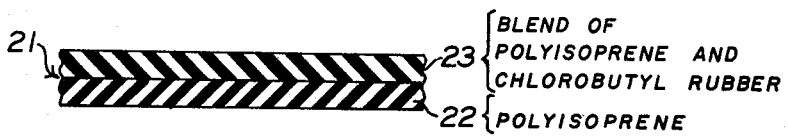

In the embodiment of the invention shown in FIG. 5, the cover 21 is a composite laminate of at least 2 discernible layers 25 and 26 with the innermost downward facing layer 25 comprised of polyisoprene such as natural rubber or synthesized "natural rubber" and the outermost upward facing layer 26 is comprised of a vulcanized blend of polyisoprene and chlorinated butyl rubber as discussed in relation to FIG. 3. In this case the polyisoprene layer 22 is in contact with the hot wet chlorine gas atmosphere within the cell and resists the penetration of the chlorine into the cell cover 21. The outer layer 23 comprised of the vulcanized blend of polyisoprene and chlorinated butyl rubber is heat resistant and also resists the penetration of any chlorine gas that may pass through the inner polyisoprene layer 22 and the blend also resists the penetration of oxygen and ozone from outside the cell.

Figure 6:
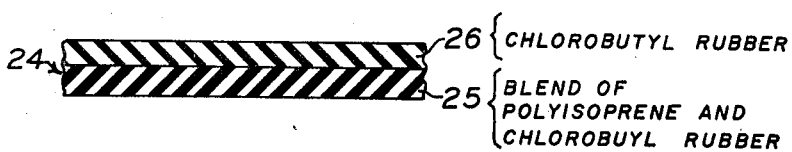

In FIG. 6 the cover 24 has an innermost downward facing layer 25 comprised of a vulcanized blend of polyisoprene and chlorinated butyl rubber and acts in the same manner as described in relation to FIG. 3. The outermost upward facing layer 26 is comprised of a heat-resistant, fluid-impermeable material such as chlorinated butyl rubber which resists the penetration of oxygen and ozone from outside the cell.

It should be apparent from the above embodiments of the invention that the improvement herein resides at least partially in providing in combination a first vulcanized rubbery polymer of the type described contained at least within an inwardly facing portion of the cover which will resist the hot wet chlorine atmosphere originating within the cell and a second vulcanized rubbery polymer of the type described contained at least within an outwardly facing portion of the cover which will resist both the permeation and attack of chlorine originating from within the cell and will also resist the permeation of oxygen gas and ozone originating in the atmosphere surrounding the anodes on the outside of the cell.

It has been determined that the cover and particularly the outwardly facing portion of the cover should be resistant to heat. For example, when tested according to ASTM D-573 for 7 days at 250° F., the cover or at least the outwardly disposed layer of the cover should exhibit a hardness increase of less than 10 points when measured on the Shore A scale.

It has also been determined that particularly the outwardly facing portion of the cover should be comprised of elastomeric or polymeric material having an air diffusion or air permeability value of less than $$0.00300 \frac{(cu.\ ft.)\ (mils)}{(sq.\ ft.)\ (day)\ (p.s.i.)}$$

and perferably less than $$0.00200 \frac{(cu.)\ (ft.)\ (mils)}{(sq.\ ft.)\ (day)\ (p.s.i.)}$$

when this value is determined by the following equation:

$$Q = \frac{qd}{At(p_1 - p_2)}$$

where:

$Q$ = the permeability at steady state diffusion.
$q$ = volume of gas diffusing through the sample of cover or cover layer in cubic feet.
$d$ = thickness of the sample being tested.
$A$ = area of the sample surface.
$t$ = time of diffusion.
$(p_1-p_2)$ = the pressure drop across the polymer in lbs./sq. in.

The permeability is defined as the number of cubic feet of air (at 32° F. and 29.92 in Hg) diffusing through 0.001 inch thickness of sample under a pressure differential of 1 lb./sq. in. per sq. ft. of sample per day. The air diffusion apparatus used in testing the samples, for example, is identified in Example 4.

In the practice of this invention, the polyisoprene polymer is selected from the group consisting of natural rubber and synthetic rubber of a cis-1,4 polymer of isoprene which may contain up to 15 percent of the trans polymer and which are similar to natural rubber in structure and use. The natural rubber that can be used is any of the well-known types such as pale crepe and smoked sheet, chemically treated natural rubber or balata. It has been found that polyisoprene polymers of the type described, when compounded properly, will be resistant to the permeation and attack of hot chlorine gases and other corrosive compounds present within the interior of a mercury type chlorine cell.

In accordance with the invention, a vulcanized rubbery polymer resistant to the permeation of fluids, heat and high ozone concentrations is at least one polymer selected from the group consisting of butyl rubber, chlorinated butyl rubber, brominated butyl rubber and a chlorosulfonated polyethylene.

Butyl rubber is a copolymer of a major proportion, preferably 85 to 99.5 weight percent of a multiolefin. The isoolefin is generally a $C_4$–$C_8$ olefin such as isobutylene or 3-methyl butene-1. Preferred is isobutylene. The multiolefin generally has about 4–14 carbon atoms; representative examples are myrcene, isoprene and butadiene. Preferred are isoprene and butadiene, most preferred is isoprene. The nature and production of butyl rubber is well described in the prior art, see U.S. Pat. No. 2,356,128, for example.

The halogenated butyl rubbers, often referred to as halobutyl rubbers, are well known in the art being prepared normally by the halogenation of butyl rubber. Halobutyl rubbers include chlorobutyl as well as bromobutyl rubber. Descriptions of halobutyl rubber and its preparation appear in U.S. Pat. No. 3,242,148, the revelations of which are incorporated herein by reference. In chlorobutyl rubber, typically the chlorine content is less than 3 percent by weight normally being about 1.1 to about 1.3 weight percent. Normally about 75% of the unsaturation in the original butyl rubber is retained on chlorination, the unsaturation usually being from about 1.1 to about 1.7 percent. A typical molecular structure of Enjay Butyl HT Polymer is shown as follows:

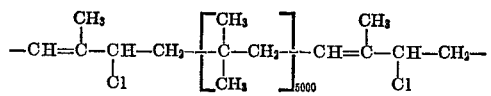

The compounding and vulcanization of chlorobutyl rubber is well known; see U.S. Pat. No. 3,197,446, the disclosures of which are incorporated herein by reference. Sulfur and accelerator combinations or zinc oxide, zinc chloride, diamines and dithiols are examples of compounds which can be used in the vulcanization of halobutyl rubber. Bromobutyl rubber is similar to chlorobutyl rubber, the main difference being that it contains bromo groups rather than chloro groups. Butyl rubbers containing both chloro and bromo groups can also be used.

Halogenated butyl rubbers are also described in the Encyclopedia of Chemical Technology, 2nd Supplement Vol., edited by Raymond E. Kirk and Donald F. Othmer, The Interscience Encyclopedia, Inc., New York, pages 716 to 734, and the Encyclopedia of Polymer Science and Technology, Vol. 2, Interscience Publishers, a division of John Wiley & Sons, Inc., New York, London, Sydney, pages 762, 763, 771, 772 and 782. The revelations of these references are incorporated herein by reference.

The chlorosulfonated polyethylenes which can be used in the present invention are solid polymers and are well known in the art. They possess a chlorine content of 10 percent to 50 percent, preferably 25 to 50 percent, more preferably 25 to 30 percent, and most preferably 28 to 30 percent. They can be prepared by the chlorination of polyethylene and reacting the polymer with sulfur dioxide to introduce sulfonyl chloride groups. These polymers are described in U.S. Pats. 2,212,786; 2,586,363; 2,646,422; 2,862,917; 2,879,261; 2,972,604 and 2,982,759. The sulfur content of the polymers due to the sulfonyl groups is from 0.40 percent to 3.0 percent, preferably 0.70 percent to 3.0 percent and most preferably 1.0 to 1.5 percent. A typical polymer has a molecular weight of about 20,000; a specific gravity of about 1.11 to 1.28 and a raw polymer viscosity of 30 to 66 ML–4 at 212° F.).

It has been determined that a vulcanized blend or covulcanization of a polyisoprene polymer and a polymer resistant to the permeation of fluids, heat and high ozone concentrations such as butyl rubber, chlorinated butyl rubber, brominated butyl rubber and a chlorosulfonated polyethylene will provide a composition for the chlorine cell cover which will resist the deleterious substances both within and outside the cell. In a preferred form of the invention, the second polymer is at least one halogenated polymer of butyl rubber selected from the group consisting of chlorinated butyl and brominated butyl rubber and the weight ratio of polyisoprene to the halogenated polymer is from about 35/65 to about 65/35. In an even more preferred form of the invention, the second polymer is chlorinated butyl rubber and the weight ratio of polyisoprene to the chlorinated butyl rubber is from about 45/55 to about 55/45.

Various vulcanizing agents well known in the art may be used to cure or vulcanize (covulcanize) the blend used in the practice of the present invention. Representative examples of the vulcanizing agents are: vulcanizing agents of the peroxide type, such as dicumyl peroxide, or of the nitroso compound type, or sulfur and the sulfur-containing agents such as benzothiazole disulfide, tetramethyl thiuram disulfide, 4,4-dithiodimorpholine, 4-morpholino-2 benzothiazole disulfide, or diphenyl guanidine. Activators well known in the art such as zinc oxide, magnesium oxide and stearic acid should also be used to enhance the cure.

The above-named vulcanizing agents with the exception of the peroxide type are also well known for the vulcanization of halobutyl rubbers such as chlorinated butyl and brominated butyl rubbers.

Any of the well-known vulcanizing agents as named above may be used to cure the polyisoprene butyl and chlorosulfonated polyethylene compositions of the present invention. The cure may be enhanced by the presence of zinc oxide and stearic acid.

Various additives, fillers, plasticizers and pigments can also be added to the polymers of the present invention. Examples of such materials are: carbon blacks, particularly of the fast extruding furnace and high abrasion furnace types and plasticizers, such as petroleum oils, naturally occurring and synthetic ester oils, and resinous polymers of the naturally occurring and synthetic types.

The method of making the flexible vulcanized elastomeric covers of the present invention which may be used, for example, in an electrolytic cell of the mercury type for the production of chlorine includes compounding the various polymeric formulations as discussed above to form a rubbery vulcanized composition. This can be accomplished by conventional mixing techniques using conventional rubber processing equipment such as a Banbury mixer or mixing mill. Equivalent results are obtained with internal Banbury mixed formulations and mill mixed formulations. Curatives may be added during either a first or second pass in the Banbury mixer or separately on a mixing mill. The rubbery polymeric formulations of the fluid impermeable materials may be formed into a vulcanized cover in a conventional manner, for example, by using a rubber calender or extruder to form the cover into the desired dimensions and by thereafter vulcanizing or curing the formed cover by means of a curing press, rotocure, autoclave or hot air oven. In fabricating the composite laminates of the invention, various plies of elastomeric material may be fabricated by calendering or extruding one onto the other or may be made separately and laminated together by means of suitable adhesives. Any of the well-known adhesives such as cyclized rubber cements and natural rubber cements may be used for this purpose. These cements are customarily prepared by dissolving the indicated rubbers in suitable solvents such as solvent naphtha; aromatic hydrocarbons such as benzene, toluene, or xylene; or chlorinated solvents such as trichloroethylene or carbon tetrachloride to form the cements. When the laminates are prepared by calendering or extruding the elastomeric plies together, the use of an adhesive is unnecessary. The holes are preferably provided after vulcanization by means of punching or cutting but may also be provided during a molding process if desired. Finally, the cover is formed in the desired dimensions and installed in an electrolytic chlorine cell, for example, of the mercury type.

The following examples further illustrate the objects and advantages of this invention.

EXAMPLE 1

A flexible vulcanized elastomeric cover 15 of the type shown in FIGS. 1–3 was manufactured having the following composition:

| Components: | Parts by weight |
| --- | --- |
| Polyisoprene [1] | 55.00 |
| Chlorobutyl rubber [2] | 45.00 |
| Magnesium oxide | 1.00 |
| Non-black filler | 5.00 |
| Carbon black | 65.00 |
| Stearic acid | 2.00 |
| Antioxidant | 1.00 |
| Paraffin wax | 1.00 |
| Plasticizer | 6.00 |
| Zinc oxide | 5.00 |
| Vulcanizing agents | 2.80 |
| Total | 188.80 |

[1] Obtained as Natsyn 400. Sold by The Goodyear Tire & Rubber Company.
[2] Enjay Butyl HT 1066 Polymer.

In the above compositions the plasticizer used was naphthenic oil, the carbon black used was of the fast extruding furnace type and the non-black filler was silica. The vulcanizing agents used were of the sulfur donor type with thiazole acceleration.

The above formula is expressed in proportions on the basis of parts by weight based on the weight of the polyisoprene and chlorobutyl rubber.

The above composition was prepared in the following manner. All the compounding ingredients except the zinc oxide and the vulcanizing agents were added to a Banbury mixer and mixed to produce a non-productive stock. The zinc oxide and vulcanizing agents were then added to the non-productive stock in the Banbury during a second pass mixing procedure.

After the mixing procedure was complete, samples were taken from the composition and were tested for original and heat-aged physical properties. The results of these tests are given in Table I below. The samples were compression molded in a vulcanizing press at 365° F. at the times listed below in Table I.

TABLE I

| | 6 min. | 8 min. | 10 min. | 12 min. | 15 min. |
| --- | --- | --- | --- | --- | --- |
| Original cure at 365° F. (ASTM D-412): | | | | | |
| Ultimate tensile (p.s.i.) | 1,800 | 1,700 | 1,500 | 1,650 | 1,550 |
| Elongation, percent | 450 | 430 | 400 | 410 | 370 |
| Modulus 100% elongation | 250 | 250 | 250 | 250 | 250 |
| Modulus 200% elongation | 700 | 650 | 650 | 680 | 700 |
| Modulus 300% elongation | 1,250 | 1,150 | 1,200 | 1,200 | 1,250 |
| Durometer hardness (Shore A)[1] | 60 | 61 | 61 | 62 | 62 |
| Durometer hardness (Shore A)[2] | 60 | 60 | 61 | 61 | 61 |
| Oven aged 168 hrs at 212° F. (ASTM D-573): | | | | | |
| Ultimate tensile (p.s.i.) | 950 | 950 | 900 | 950 | 850 |
| Elongation, percent | 290 | 300 | 280 | 310 | 280 |
| Modulus 100% elongation | 300 | 300 | 300 | 300 | 300 |
| Modulus 200% elongation | 700 | 700 | 650 | 650 | 650 |
| Durometer hardness (Shore A)[1] | 61 | 61 | 62 | 59 | 61 |
| Tension set 50% extension (ASTM D-412): percent set | 39 | 41 | 41 | 40 | 40 |

[1] Average of two sheets.
[2] Average of three sheets.

Another group of samples were obtained and were tested for the same physical properties, as presented in Table I. The results of these tests are given below in Table II. The samples were compression molded in a vulcanizing press at 305° F. at the time shown below in Table II.

TABLE II

|  | 30 min. | 40 min. | 60 min. |
|---|---|---|---|
| Original cure at 305° F. (ASTM D-412): | | | |
| Ultimate tensile (p.s.i.) | 1,850 | 1,750 | 1,750 |
| Elongation, percent | 510 | 460 | 430 |
| Modulus 100% elongation | 200 | 200 | 240 |
| Modulus 200% elongation | 600 | 600 | 700 |
| Modulus 300% elongation | 1,080 | 1,100 | 1,200 |
| Durometer hardness (Shore A)[1] | 60 | 60 | 60 |
| Durometer hardness (Shore A)[2] | 60 | 60 | 59 |
| Oven age–70 hrs. at 212° F. (ASTM D-573): | | | |
| Ultimate tensile (p.s.i.) | 1,050 | 1,050 | 1,000 |
| Elongation, percent | 340 | 350 | 360 |
| Modulus 100% elongation | 250 | 250 | 250 |
| Modulus 200% elongation | 650 | 600 | 550 |
| Modulus 300% elongation | 950 | 900 | 850 |
| Durometer hardness (Shore A)[1] | 60 | 62 | 61 |
| Tension set 50% extension (ASTM D-412) | 38 | 35 | 36 |
| Oven age–168 hrs. at 212° F. (ASTM D-573): | | | |
| Ultimate tensile (p.s.i.) | 850 | 800 | 800 |
| Elongation, percent | 290 | 280 | 310 |
| Modulus 100% elongation | 250 | 250 | 250 |
| Modulus 200% elongation | 600 | 600 | 550 |
| Durometer hardness (Shore A)[1] | 64 | 64 | 64 |
| Tensile set 50% extension | 40 | 39 | 39 |
| Static ozone, 50 p.p.h.m. 03–25% extension, 100° F, 168 hrs. (ASTM D-1149) | ([3]) | ([3]) | ([3]) |

[1] Average of two sheets.
[2] Average of three sheets.
[3] Excellent.

The above data contained in Tables I and II illustrate that the heat-resistant composition may be used over a wide range of cure from 305° F. to 365° F. Even though the original physical properties showed deterioration as the result of heat aging, the durometer hardness remained substantially constant demonstrating the heat-resistant properties of the composition of this invention.

The above composition was then processed on a roller die extruder and formed into rectangular sheets or webs of material having a gauge or thickness of 3/16 of an inch. One roll had a width of 79 inches and the second roll had a width of 67 inches. The sheets were next rolled into polyethylene liners. The rolls were cured in a rotocure at a temperature of 340° F. for 17 minutes. Samples were obtained from each rotocured sheet and tested to obtain tension set and static ozone data. The samples from the 79 inch width sheet which was used to produce a cell cover of like dimensions are identified as sample A. The samples from the 67 inch width sheet which was used to produce a cell cover of like dimensions are identified as sample B. The data is presented in Table III below.

TABLE III

[Tension set—aged 168 hrs. at 212° F.—50% extension]

| Sample A, percent set: | |
|---|---|
| Longitudinal direction | 36 |
| Transverse direction | 35 |
| Sample B, percent set: | |
| Longitudinal direction | 41 |
| Transverse direction | 39 |

Sample A—Further cure at 340° F. (following rotocure 17 min. at 340° F.)

|  | +5 min. | +10 min. | +15 min. | +20 min. |
|---|---|---|---|---|
| Percent set: Longitudinal direction | 38 | 38 | 38 | 38 |
| Static ozone—25% extension, 50 p.p.h.m. 03, 100° F., 168 hours (ASTM D-1149) | ([1]) | ([1]) | ([1]) | ([1]) |

[1] Excellent.

The data contained in Table III indicates that the vulcanized blend used in this invention has excellent ozone resistance and adequate modulus and tension set properties required for use in the single layer cover shown in FIG. 3.

After vulcanization, the covers A and B were prepared for installation in an electrolytic cell 10 of the type shown in FIG. 1 by being cut and trimmed to size. Cover A had a final width after trimming of 79 inches, a length of 33 feet and a gauge of 0.190 of an inch. Cover B had a final width after trimming of 63 inches, a length of 25 feet 6 inches and a gauge of 0.190 of an inch. Holes 16 were provided in the covers for insertion of the anodes 11.

The covers were installed in electrolytic cells 10 as shown in FIG. 1 of the type described in U.S. Pat. No. 2,958,635 (De Nora type). After several months of service the covers are functioning properly.

EXAMPLE 2

The composition of Example 1, for example of the type used for the layers 17, 23 and 25 of the drawings, was tested under a chlorine atmosphere along with samples of a vulcanized polymer of polyisoprene of the type used for the layers 19 and 22 of the drawings. The polyisoprene compound had the following composition:

| Components: | Parts by weight |
|---|---|
| Polyisoprene [1] | 100.00 |
| Zinc oxide | 5.00 |
| Stearic acid | 2.00 |
| Antioxidant | 1.00 |
| Plasticizer | 10.00 |
| Carbon black | 80.00 |
| Vulcanizing agents | 4.15 |
| | 202.15 |

[1] Obtained as Natsyn 400. Sold by The Goodyear Tire & Rubber Company.

In the above composition the plasticizer used was naphthenic oil. The carbon black used was of the fast extruding furnace type. The vulcanizing agents used were of the sulfur and sulfur donor type with thiazole acceleration. The above formula is expressed in proportions on the basis of parts by weight based on the weight of the polyisoprene.

Sample strips ½ of an inch by 6 inches of the vulcanized blend of polyisoprene and chlorobutyl rubber and the polyisoprene formulation were tested in the following manner. The strips were extended 10% and exposed to an atmosphere of wet chlorine at 190° F. for a period of 2 months. The vulcanized blend and the polyisoprene formulations were identical in appearance and feel. Both compositions had good elongation, no cracks with the surfaces of both samples observed to be slightly dusty.

Ten months after removal from the above-described chlorine exposure test the polyisoprene sample of synthetic natural rubber (Natsyn 400) was observed to be very stiff and cracked severely following slight bending. The cracks were similar to ozone cracks. The sample of the blended composition after the same period was not as severely cracked but also was very stiff with cracking produced following repeated flexing. The samples had been stored in a plain envelope during the 10 month period.

These test results based on visual observations and manual manipulation indicated that the vulcanized blend of polyisoprene and chlorobutyl rubber and the polyisoprene composition used in the practice of this invention have acceptable resistance to the permeation and attack of hot wet chlorine gas. The data also appears to indicate that the vulcanized blend may be superior to the polyisoprene composition for long term exposure to chlorine.

EXAMPLE 3

In order to test the increased hardness under heat aging conditions, samples of vulcanized elastomeric covers or layers of covers of various compositions were tested in accordance with ASTM D-573. Compositions A, B and C were comprised of the vulcanized blend of the present invention in the proportions indicated below. Compositions D and E were comprised of rubbery polymer formulations of polyisoprene and chlorobutyl rubber respectively.

| Components | Parts by weight | | | | |
|---|---|---|---|---|---|
| | A | B | C | D | E |
| Polyisoprene [1] | 60.00 | 55.00 | 35.00 | 100.00 | |
| Chlorobutyl rubber [2] | 40.00 | 45.00 | 65.00 | | 100.00 |
| Magnesium oxide | 1.00 | 1.00 | 1.00 | | 1.00 |
| Non-black filler | 5.00 | 5.00 | 5.00 | | 5.00 |
| Carbon black | 65.00 | 65.00 | 65.00 | 80.00 | 65.00 |
| Stearic acid | 2.00 | 2.00 | 2.00 | 2.00 | 2.00 |
| Antioxidant | 1.00 | 1.00 | 1.00 | 1.00 | 1.00 |
| Paraffin wax | 1.00 | 1.00 | 1.00 | | 1.00 |
| Plasticizer | 6.00 | 6.00 | 6.00 | 10.00 | 6.00 |
| Zinc oxide | 5.00 | 5.00 | 5.00 | 5.00 | 5.00 |
| Vulcanizing agents | 2.80 | 2.80 | 2.80 | 4.15 | 2.80 |
| Total | 188.80 | 188.80 | 188.80 | 202.15 | 188.80 |

[1] Obtained as Natsyn 400. Sold by The Goodyear Tire & Rubber Company.
[2] Enjay Butyl HT 1066 Polymer.

In Compositions A, B, C and E the same plasticizers, fillers and vulcanizing agents were used as are discussed in Example 1. In Composition D the same plasticizers and fillers were used also but the vulcanizing agents used were of the sulfur and sulfur donor type. The above formulas are expressed in proportions on the basis of parts by weight based on the weight of the polymeric components.

Compositions A, B and C as contemplated by the present invention may be used as a single layer cover or in combination with layers of other elastomeric material and accordingly may be used in both the inwardly and outwardly disposed layers (see FIGS. 3, 5 and 6). Composition D is used in the inwardly disposed layer of the cover (FIGS. 4 and 5) and Composition E is used in the outwardly disposed layer of the cover (FIGS. 4 and 6).

Samples of Compositions A–E were tested along with a sample of a commercial grade cover of a basically neoprene composition of the type previously used as the outwardly disposed layer of an electrolytic cell cover of the mercury type. The neoprene layer was labeled as Composition F. The results of the tests are listed below in Table III.

TABLE III

| Composition | Days at 250° F. (ASTM D-573) | | | | | | Hardness change (Shore A) |
|---|---|---|---|---|---|---|---|
| | 0 | 1 | 2 | 5 | 6 | 7 | |
| A | 61 | 63 | 63 | 63 | 64 | 65 | +4 |
| B | 62 | 64 | 65 | 65 | 67 | 67 | +5 |
| C | 65 | 70 | 70 | 70 | 70 | 73 | +8 |
| D | 63 | | | 73 | | 73 | +10 |
| E | 67 | 72 | 72 | 75 | 76 | 76 | +9 |
| F | 61 | 73 | 75 | 82 | 85 | 86 | +25 |

The above data indicates that the hardness increase upon heat aging of Compositions A–E was far less than that of Composition F. This indicates that the presently used neoprene composition is less acceptable in heat aging characteristics than the composition of this invention.

EXAMPLE 4

Samples of layers of vulcanized elastomeric covers having various compositions were tested to determine their fluid or air diffusion or air permeability properties. Compositions A through F were the same as described in Example 3. In addition, an ethylene propylene terpolymer formulation having the following composition was also tested and was labeled Composition G.

| Component: | Parts by weight |
|---|---|
| Ethylene propylene terpolymer [1] | 100.00 |
| Carbon black | 80.00 |
| Stearic acid | 1.00 |
| Antioxidant | 1.00 |
| Plasticizer | 25.00 |
| Zinc oxide | 5.00 |
| Vulcanizing agents | 3.00 |
| | 216.00 |

[1] Enjay 6505 sold under the trade name Vistalon.

In Composition G the plasticizer used was naphthenic oil and the carbon black used was of the fast extruding furnace type. The vulcanizing agents used were of the sulfur and sulfur donor type with thiazole acceleration. The above formula is expressed in proportions on the basis of parts by weight based on the weight of the ethylene propylene terpolymer.

Compositions F and G are the same or similar to types of elastomeric material which are currently being used in the outwardly disposed layer of a chlorine cell cover. Compositions A, B, C and E are examples of elastomeric material as contemplated by this invention which are used in the outwardly disposed layer of a chlorine cell cover. In addition, Compositions A, B, C and D are examples of elastomeric materials as contemplated by this invention for use in the inwardly disposed layer of a chlorine cell cover.

The samples were tested in an air diffusion apparatus which was an adaptation of the equipment made at the University of Akron Government Laboratories, Akron, Ohio according to specifications furnished by the B. F. Goodrich Company. The apparatus consisted of a regulated air supply, controlled temperature water bath, 6 specimen cells and 6 Warburg manometers for collecting and measuring the diffused air.

Details of the apparatus and procedure are provided in a polymer development report entitled "Air Permeability of Elastomers by Diffusion Tests," Project 418–5, AU–1078 submitted by M. Czuha to Reconstruction Finance Development Division Polymer Science Branch on Aug. 1, 1952.

The results of the air diffusion test are presented in Table IV below:

TABLE IV

| Composition: | Permeability [1] |
|---|---|
| A | .00168 |
| B | .00144 |
| C | .00067 |
| D | .00279 |
| E | .00002 |
| F | .00076 |
| G | .00394 |

[1] Defined as the number of cubic feet of air (at 320° F. and 29.92 in. Hg) diffusing through 0.001 inch thickness of polymer under a pressure differential of 1 lb./sq. in. per sq. ft. of polymer per day.

The data indicates that the air diffusion rates of Compositions A–F are less than that of Composition G showing that the ethylene propylene terpolymer material has an undesirably high permeation to fluids. Composition E has the lowest fluid permeation and Composition C compares favorably to Composition F which is in current commercial use. Compositions A, B and D have acceptable fluid impermeable properties for the use contemplated with Compositions A, B, C and E being preferred for use in the outwardly disposed layer of the cover.

In the practice of the present invention, all of the above examples can be repeated by substituting polymers of butyl, bromobutyl and chlorosulfonated polyethylene for the chlorobutyl polymer with equivalent results. Of course, appropriate compounding changes well known to those skilled in the art may become necessary due to the substitution.

It should be apparent to those skilled in the art that the present invention provides a flexible cell cover for an electrolytic cell having improved fluid impermeable properties capable of withstanding the deleterious substances present both within the cell and outside the cell.

Moreover, though the use of the flexible covers of this invention have been illustrated in conjunction with an electrolytic chlorine cell of the mercury type, it should be apparent to those skilled in the art that the vulcanized cover may also be used in cells for the production of chlorine, for example, a diaphragm type electrolytic cell. In this regard, the cover of this invention is similar in composition and structure to the flexible sheet particularly suitable for a diaphragm type cell as disclosed in our copending application Ser. No. 251,751, now abandoned, entitled "Flexible Sheet for an Electrolytic Cell and the Method of Making said Sheet" filed on even date herewith.

While certain representative embodiments and details have been shown for the purpose of illustrating the invention, it will be apparent to those skilled in the art that various changes and modifications may be made therein without departing from the spirit or scope of the invention.

We claim:

1. In an electrolytic cell for the production of chlorine, a flexible elastomeric cover for said cell, said cover including at least one layer comprised of a vulcanized blend of a first vulcanized rubbery polymer resistant to the permeation and attack of chlorine, said first polymer being contacted by the hot wet chlorine gas atmosphere originating within the cell and a second vulcanized rubbery polymer resistant to heat and the permeation of fluids and high ozone concentrations, said second polymer being contacted by the oxygen and ozone atmosphere originating outside the cell, said cover thereby being resistant to the combined effects of chlorine, oxygen, ozone and heat.

2. The invention as claimed in claim 1 wherein said first polymer is a polyisoprene selected from the group consisting of natural rubber and synthetic rubber of a cis 1,4-polymer of isoprene and said second polymer is at least one polymer selected from the group consisting of butyl rubber, chlorinated butyl rubber, brominated butyl rubber and a chlorosulfonated polyethylene.

3. The invention as claimed in claim 1 wherein said cover includes a composite laminate of at least two discernible layers with the innermost downward layer comprised of said first polymer and the outermost upward layer comprised of a vulcanized blend of said first and second polymers.

4. The invention as claimed in claim 1 wherein said cover includes a composite laminate of at least two discernible layers with the innermost downward layer comprised of a vulcanized blend of said first and second polymers and said outermost upward layer comprised of said second polymer.

5. The invention as claimed in claim 1 wherein the elastomeric material of at least the outwardly facing portion of said cover has a permeability of less than $$0.00300 \frac{(\text{cu. ft.}) (\text{mils})}{(\text{sq. ft.}) (\text{days}) (\text{p.s.i.})}$$

6. The invention as claimed in claim 2 wherein said second polymer is at least one halogenated polymer of butyl rubber selected from the group consisting of chlorinated butyl and brominated butyl rubber.

7. The invention as claimed in claim 6 wherein the weight ratio of polyisoprene to said halogenated polymer is from about 35/65 to about 65/35.

8. The invention as claimed in claim 6 wherein said second polymer is chlorinated butyl rubber and the weight ratio of polyisoprene to said chlorinated butyl rubber is from about 45/55 to about 55/45.

9. In an electrolytic chlorine cell of the mercury type comprising in combination a container suitable for containing a brine solution, anodes and cathodes positioned to contact the brine solution and through which a sufficient electrical potential may be applied to electrolyze the brine solution, thereby forming chlorine gas at the anodes, said anodes being supported outside said container and extending therein, a flexible fluidtight cover sealing the top of the cell through which the anodes extend, the improvement wherein said cover includes at least one layer comprised of a vulcanized blend of a first vulcanized rubbery polymer contained at least within the inwardly facing portion of the cover, said first polymer resistant to the hot wet chlorine atmosphere within the cell and a second vulcanized rubbery polymer contained at least within the outwardly facing portion of the cover, said second polymer resistant to heat and the permeation of chlorine gas from within the cell and also resistant to the permeation of oxygen gas and ozone in the atmosphere surrounding the anodes on the outside of the cell, said second polymer being in contact with the oxygen and ozone.

10. The invention as claimed in claim 9 wherein said first polymer is a polyisoprene selected from the group consisting of natural rubber and synthetic rubber of a cis 1,4-polymer of isoprene and said second polymer is at least one polymer selected from the group consisting of butyl rubber, chlorinated butyl rubber, brominated butyl rubber and a chlorosulfonated polyethylene.

11. The invention as claimed in claim 9 wherein said cover includes a composite laminate of at least two discernible layers with the inwardly facing layer comprised of said first polymer and the outwardly facing layer comprised of a vulcanized blend of said first and second polymers.

12. The invention as claimed in claim 9 wherein said cover includes a composite laminate of at least two discernible layers with the inwardly facing layer comprised of a vulcanized blend of said first and second polymers and said outwardly facing layer comprised of said second polymer.

13. The invention as claimed in claim 9 wherein the elastomeric material of at least the outwardly facing portion of said cover has a permeability of less than $$0.00300 \frac{(\text{cu. ft.}) (\text{mils})}{(\text{sq. ft.}) (\text{days}) (\text{p.s.i.})}$$

14. The invention as claimed in claim 10 wherein said second polymer is at least one polymer of halobutyl rubber selected from the group consisting of chlorinated butyl and brominated butyl rubber.

15. The invention as claimed in claim 14 wherein the weight ratio of polyisoprene to said polymer of halobutyl rubber is from about 35/65 to about 65/35.

16. The invention as claimed in claim 15 wherein said second polymer is chlorobutyl rubber and the weight ratio of polyisoprene to said chlorobutyl rubber is from about 45/55 to about 55/45.

References Cited

UNITED STATES PATENTS 3,450,621  6/1969  Anderson _____ 204—219
2,998,374  8/1961  Granfors _____ 204—279 X JOHN H. MACK, Primary Examiner D. R. VALENTINE, Assistant Examiner US. Cl. X.R.

204—250, 279